(12) United States Patent
Pereira

(10) Patent No.: US 9,043,055 B2
(45) Date of Patent: May 26, 2015

(54) METHOD OF DETERMINING A TURBULENT CONDITION IN AN AIRCRAFT

(71) Applicant: GE Aviation Systems LLC, Grand Rapids, MI (US)

(72) Inventor: Frazer Leslie Pereira, Mumbai (IN)

(73) Assignee: GE Aviation Systems LLC, Grand Rapids, MI (US)

( * ) Notice: Subject to any disclaimer, the term of this patent is extended or adjusted under 35 U.S.C. 154(b) by 345 days.

(21) Appl. No.: 13/720,008

(22) Filed: Dec. 19, 2012

(65) Prior Publication Data

US 2014/0074326 A1 Mar. 13, 2014

(30) Foreign Application Priority Data

Sep. 7, 2012 (IN) .......................... 2787/DEL/2012

(51) Int. Cl.
| | | |
|---|---|---|
| *G06F 7/70* | (2006.01) | |
| *G06F 19/00* | (2011.01) | |
| *G06G 7/00* | (2006.01) | |
| *G06G 7/76* | (2006.01) | |
| *B64D 45/00* | (2006.01) | |
| *G08G 5/00* | (2006.01) | |
| *G01W 1/00* | (2006.01) | |
| *G01C 21/10* | (2006.01) | |

(52) U.S. Cl.
CPC ............. *B64D 45/00* (2013.01); *G08G 5/0091* (2013.01); *G01W 1/00* (2013.01); *G01C 21/10* (2013.01); *G01W 2001/003* (2013.01)

(58) Field of Classification Search
CPC .......... B64D 45/00; B64D 43/00; B64D 7/00; B64D 35/00; G06F 19/00; G06F 3/0346; G06F 3/033; G01C 21/00; G01C 19/00; G08G 5/0039; G08G 5/0021; G08G 5/0091; G08G 5/0008
USPC ............ 702/153, 150; 701/14, 464, 3, 120, 9, 701/10, 4, 532, 28; 340/945, 963, 500, 602
See application file for complete search history.

(56) References Cited

U.S. PATENT DOCUMENTS

| | | | |
|---|---|---|---|
| 4,891,642 A | 1/1990 | Muller | |
| 5,541,591 A | 7/1996 | Bush | |
| 5,601,256 A | 2/1997 | Harris | |
| 7,196,621 B2 * | 3/2007 | Kochis | ..................... 340/539.13 |
| 7,761,197 B2 * | 7/2010 | Puig | ................................ 701/14 |
| 7,917,255 B1 * | 3/2011 | Finley | ................................ 701/9 |
| 8,130,121 B2 * | 3/2012 | Smith et al. | ................... 340/945 |
| 8,629,788 B1 * | 1/2014 | Greenleaf et al. | ............ 340/968 |

(Continued)

OTHER PUBLICATIONS

Your iPhone and Macbook can Detect Earthquakes!, Digital Inspiration (www.labnol.org), Amit Agarwal, Jun. 1, 2012, 2 pages.

(Continued)

*Primary Examiner* — Calvin Cheung
*Assistant Examiner* — Luis A Martinez Borrero
(74) *Attorney, Agent, or Firm* — General Electric Company; William S. Munnerlyn

(57) ABSTRACT

A method of determining a turbulent condition in an aircraft with a handheld device where the handheld device has at least one of a gyroscope, seismometer, and an accelerometer where the method includes receiving an output from the at least one of the gyroscope, seismometer, and accelerometer while the handheld device is located within the aircraft and providing an indication of a turbulent condition.

20 Claims, 4 Drawing Sheets

(56) References Cited

U.S. PATENT DOCUMENTS

| | | | |
|---|---|---|---|
| 8,798,817 B2* | 8/2014 | O'Dell et al. | 701/14 |
| 2008/0021601 A1* | 1/2008 | Puig | 701/14 |
| 2008/0255714 A1* | 10/2008 | Ross | 701/14 |
| 2010/0328143 A1 | 12/2010 | Kirk | |
| 2011/0191237 A1* | 8/2011 | Faith et al. | 705/39 |
| 2011/0257818 A1* | 10/2011 | Ganz et al. | 701/14 |
| 2011/0282524 A1* | 11/2011 | Mutuel et al. | 701/14 |
| 2011/0307213 A1* | 12/2011 | Zhao et al. | 702/153 |
| 2013/0158941 A1* | 6/2013 | Yang et al. | 702/141 |
| 2013/0197725 A1* | 8/2013 | O'Dell et al. | 701/14 |

OTHER PUBLICATIONS

European Search Report and Written Opinion for EP Application: 13183234.7 mailed Aug. 12, 2014.

* cited by examiner

METHOD OF DETERMINING A TURBULENT CONDITION IN AN AIRCRAFT

CROSS-REFERENCE TO RELATED APPLICATIONS

This application claims priority under 35 U.S.C. §119 to Indian Patent Application No. 2787DEL2012, filed Sep. 7, 2012, the disclosure of which is incorporated herein by reference in its entirety.

BACKGROUND OF THE INVENTION

Contemporary aircraft may have a variety of sensors that may collect information and provide such information to the operators of the aircraft. For example, information from a range of sensors may be used to provide the flight crew with a display of the detected turbulence and the orientation of the aircraft. Such a system is cumbersome, weighty, and the failure of a single sensor may disable the system.

BRIEF DESCRIPTION OF THE INVENTION

In one embodiment, the invention relates to a method of determining a turbulent condition in an aircraft with a handheld device having at least one of a gyroscope, seismometer, and an accelerometer including receiving an output from the at least one of the gyroscope, seismometer, and accelerometer while the handheld device is located within the aircraft, comparing the received output to a turbulence threshold value for the received output, and providing an indication of a turbulent condition when the comparison indicates the received output exceeds the turbulence threshold value.

DETAILED DESCRIPTION OF THE INVENTION

Figure 1:
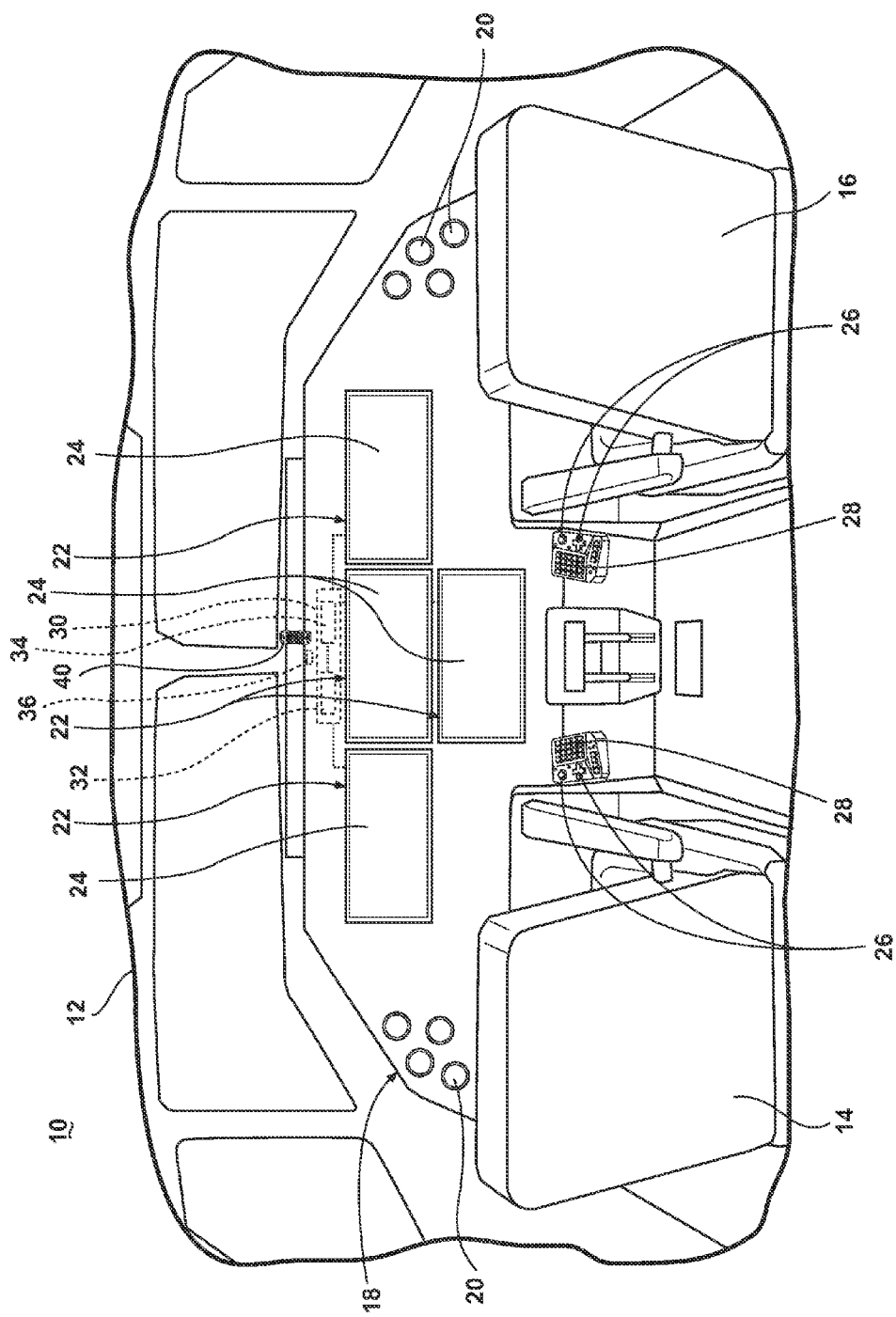
FIG. 1 is a schematic illustration of a cockpit of an aircraft providing one example of an environment in which embodiments of the invention may be executed.

FIG. 1 illustrates a portion of an aircraft 10 having a cockpit 12. While a commercial aircraft has been illustrated, it is contemplated that embodiments of the invention may be used in any type of legacy aircraft, for example, without limitation, fixed-wing, rotating-wing, rocket, personal aircraft, and military aircraft. A first user (e.g., a pilot) may be present in a seat 14 at the left side of the cockpit 12 and another user (e.g., a co-pilot) may be present at the right side of the cockpit 12 in a seat 16. A flight deck 18 having various instruments 20 and multiple multifunction flight displays 22 may be located in front of the pilot and co-pilot and may provide the flight crew with information to aid in flying the aircraft 10.

The flight displays 22 may include either primary flight displays or multi-function displays and may display a wide range of aircraft, flight, navigation, and other information used in the operation and control of the aircraft 10. The flight displays 22 may be capable of displaying color graphics and text to a user. The flight displays 22 may be laid out in any manner including having fewer or more displays and need not be coplanar or the same size. A touch screen display or touch screen surface 24 may be included in the flight display 22 and may be used by one or more flight crew members, including the pilot and co-pilot, to interact with the systems of the aircraft 10. It is contemplated that one or more cursor control devices 26, such as a mouse, and one or more multifunction keyboards 28 may be included in the cockpit 12 and may also be used by one or more flight crew members to interact with the systems of the aircraft 10.

A controller 30 may be operably coupled to components of the aircraft 10 including the flight displays 22, touch screen surface 24, cursor control devices 26, and keyboards 28. The controller 30 may include memory 32, the memory may include random access memory (RAM), read-only memory (ROM), flash memory, or one or more different types of portable electronic memory, such as discs, DVDs, CD-ROMs, etc., or any suitable combination of these types of memory. The controller 30 may include a processor 34, which may be running any suitable programs to implement a graphical user interface (GUI) and operating system. These programs typically include a device driver that allows the user to perform functions on the touch screen surface 24 such as selecting options, inputting commands and other data, selecting and opening files, and moving icons through the touch screen surface 24. The controller 30 may be a portion of an FMS or may be operably coupled to the FMS.

A computer searchable database of information may be stored in the memory 32 and accessible by processor 34. The processor 34 may run a set of executable instructions to display the database or access the database. Alternatively, the controller 30 may be operably coupled to a database of information. For example, such a database may be stored on an alternative computer or controller. It will be understood that the database may be any suitable database, including a single database having multiple sets of data, multiple discrete databases linked together, or even a simple table of data.

The controller 30 may also be connected with other controllers (not shown) of the aircraft 10. The controller 30 may be capable of wirelessly linking with other systems or devices through a wireless communication link 36, which may be included in the aircraft 10 and may be communicably coupled to the controller 30 so that the controller 30 may transfer information with wirelessly connected devices and systems through the wireless communication link 36. Such a wireless communication link 36 may include, but is not limited to, packet radio, satellite uplink, Wireless Fidelity (WiFi), WiMax, AeroMACS, Bluetooth, ZigBee, 3G wireless signal, code division multiple access (CDMA) wireless signal, global system for mobile communication (GSM), 4G wireless signal, long term evolution (LTE) signal, Ethernet, or any combinations thereof.

Figure 2:
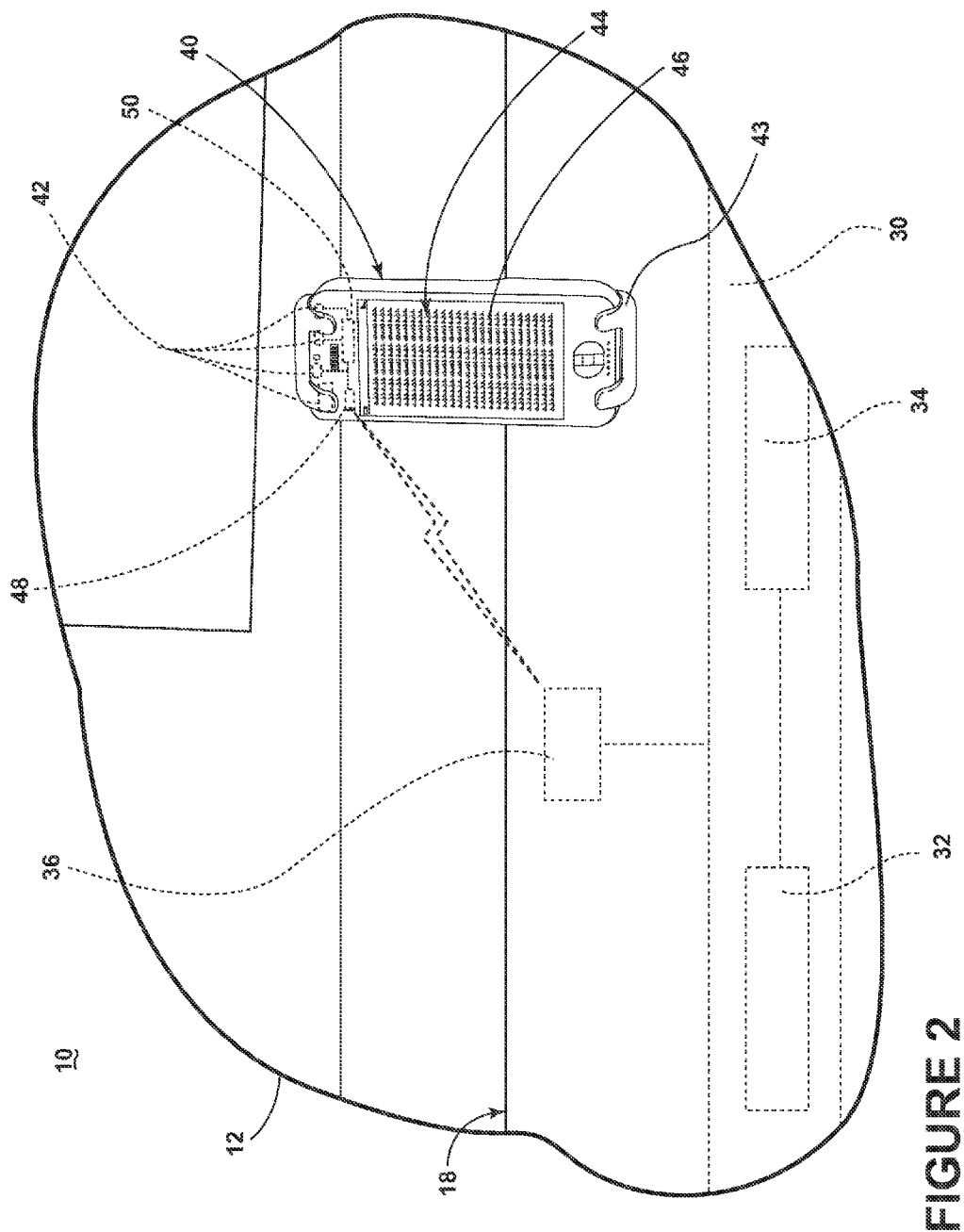
FIG. 2 is an enlarged view of a portion of the cockpit of FIG. 1 with a handheld device located therein.

Referring to FIG. 2, a handheld device 40 having a range of sensors 42 may be located in the aircraft 10. As illustrated, the handheld device 40 may reside within the cockpit 12. Alternatively, it may reside within the electronics and equipment bay of the aircraft or in other locations throughout the aircraft 10. The handheld device 40 may be mounted within the aircraft 10; for example, the handheld device may be mounted to the flight deck 18 via a bracket 43 or other suitable mechanism. Alternatively, the handheld device may be held by a flight crew member. By way of non-limiting examples, the sensors 42 included in the handheld device 40 may include any number of suitable sensors including a 3-axis gyroscope, a seismometer, a tilt sensor, an accelerometer, a vibration sensor, a resonator, etc.

A display 44 may also be included in the handheld device 40. It is contemplated that the display 44 may be a touch screen 46 such that a user may interact with the display 44 through the touch screen 46. While the handheld device 40 has been illustrated as a smartphone having a touch screen 46 it will be understood that the handheld device 40 may be a PDA, tablet PC, or other suitable device such as a handheld device manufactured for the specific purpose. A keyboard or cursor control may also be provided in the handheld device 40 to allow for user interaction with the display 44.

In order to be capable of wirelessly linking with other systems and devices, the handheld device 40 may also include any suitable wireless communication link 48 capable of wirelessly linking with other devices and systems. It will also be understood that the particular type or mode of wireless communication is not critical to this invention, and later-developed wireless networks are certainly contemplated as within the scope of this invention. It is contemplated that the controller 30 may be operably coupled to the handheld device 40 either through a wired connection or wirelessly through the wireless communication link 36 and the wireless communication link 48. Thus, it is contemplated that the handheld device 40 and the aircraft 10 may be in data communication. A controller 50 may be included in the handheld device 40 and may be operably coupled to components of the handheld device 40 including the sensors 42, display 44, touch screen 46, and wireless communication link 48. The controller 50 may include any suitable memory and processing units, which may be running any suitable programs to implement a graphical user interface (GUI) and operating system.

One of the handheld device 40 and the controller 30 of the aircraft 10 may include all or a portion of a computer program having an executable instruction set for determining a turbulent condition. Regardless of whether the handheld device 40 or the controller 30 runs the program for determining a turbulent condition, the program may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc. that have the technical effect of performing particular tasks or implement particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, or special purpose processing machine to perform a certain function or group of functions.

During operation, the sensors 42 of the handheld device 40 may collect data and such data may either be provided to the controller 50 of the handheld device 40 or the controller 30 of the aircraft 10. One of the controller 30 or the controller 50 may execute a program for determining a turbulent condition based on the output of the sensors 42. That is, the program to determine the turbulent condition may derive conclusions of whether the aircraft 10 is experiencing turbulence or whether it will encounter turbulence based on the received output from the sensors 42.

Figure 3:
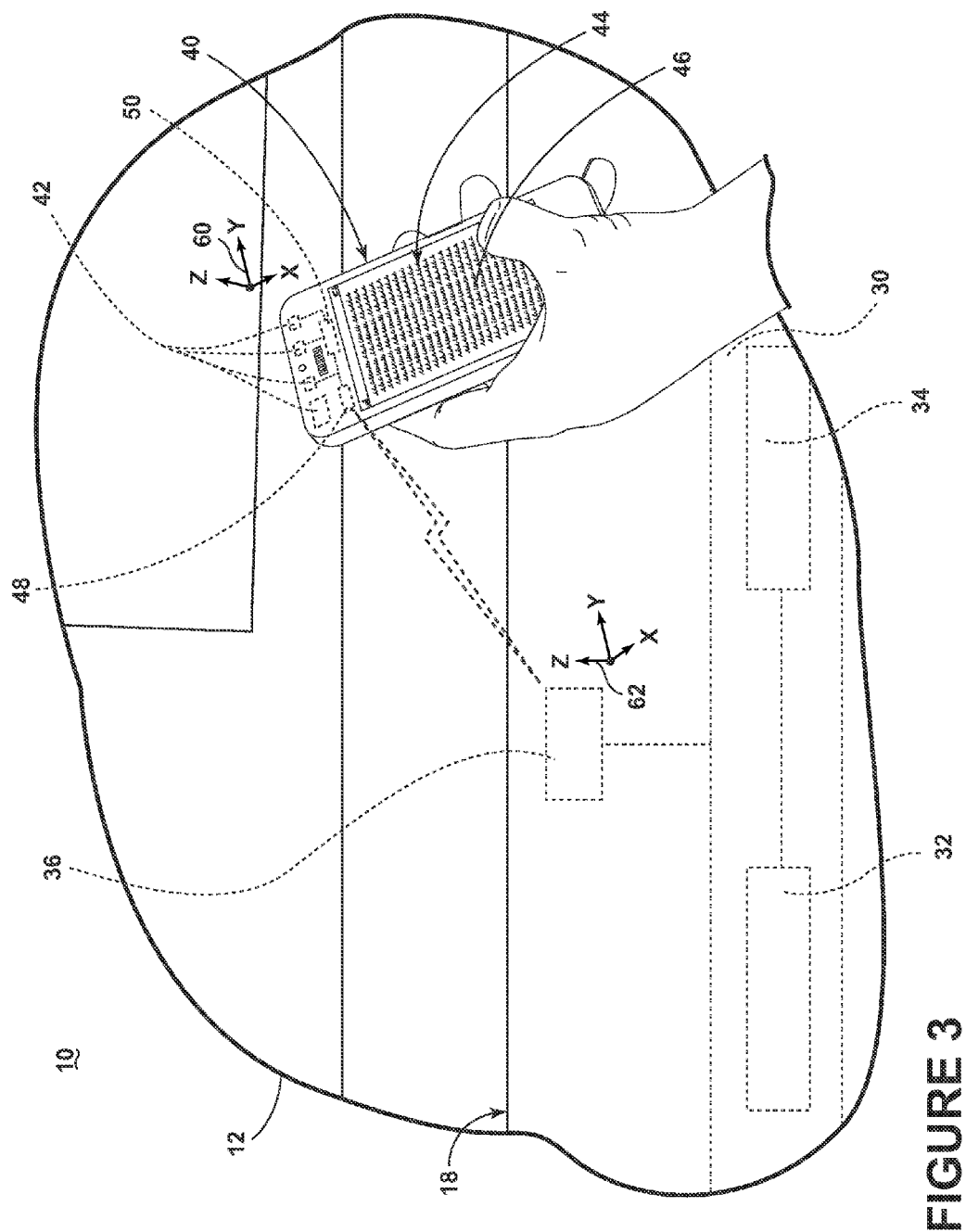
FIG. 3 is a schematic view of a handheld device being held by a crew member in the aircraft.

In the case where the handheld device 40 is held by a crewmember within the aircraft 10, the handheld device 40 may have a correctional feedback to adjust the output of the sensors 42 based on the determined attitude of the handheld device 40 relative to the attitude of the aircraft. FIG. 3 illustrates that the handheld device 40 may have a first coordinate system 60 and the aircraft 10 may have a second coordinate system 62. A transformation matrix may be generated to relate the first coordinate system 60 and the second coordinate system 62 in determining the relative attitude of the handheld device 40 and the aircraft 10. In this manner, it is contemplated that the relative attitude of the handheld device 40 and the aircraft 10 may be compensated for.

Figure 4:
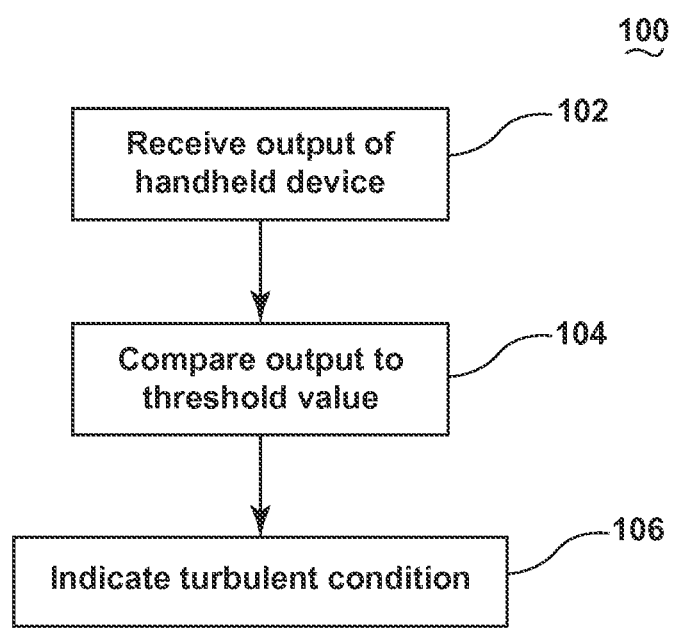
FIG. 4 is a flow chart illustrating a method of determining a turbulent condition in the aircraft of FIG. 1 according to an embodiment of the invention.

Embodiments of the invention include determining a turbulent condition in an aircraft. In accordance with an embodiment of the invention, FIG. 4 illustrates a method 100, which may be used to determine a turbulent condition in the aircraft 10 with the handheld device 40. The method begins with receiving an output from at least one of the sensors 42 while the handheld device 40 is located within the aircraft 10 at 102. At 104, the received output from the sensors 42 may be compared to a turbulence threshold value for the received output. At 106, an indication of a turbulent condition may be provided when the comparison indicates the received output exceeds the turbulence threshold value.

It is contemplated that receiving the output may include receiving an angle output from one of the sensors 42, such as a gyroscope, indicative of at least one of a pitch, roll and yaw angle of the aircraft. A rate of change for at least one of the pitch, roll and yaw angle from the angle output may be determined. Based on the determined rate of change a comparison may be made, which may include comparing the rate of change to a corresponding rate of change threshold value. Based on the comparison, it may be determined if there is a turbulent condition. Alternatively, receiving the output may include receiving a motion output from one of the sensors 42, such as a seismometer, and such a motion output may be indicative of vertical motion of the aircraft 10. Receiving the output may also include receiving acceleration output from one of the sensors 42, such as an accelerometer. The acceleration output may be indicative of the acceleration in vertical motion of the aircraft 10.

Further still, output may be received from a variety of the sensors 42. For example, receiving the output from the sensors 42 may include receiving an angle output from the gyroscope indicative of a pitch, roll and yaw angle of the aircraft, receiving a motion output from the seismometer, and receiving acceleration output from the accelerometer. In such an instance, it is contemplated that output from three of the sensors 42 may be used by the controller 30 or the controller 50 to determine at least one of the motion and rate of change in motion of the aircraft 10 in a vertical direction from the angle output, motion output, and acceleration output. As described above, software may be executed on one of the handheld device 40 and the controller 30 of the aircraft 10. The software may receive as input the angle output, motion output, and acceleration output and may then be executed to calculate the motion and/or the rate of change of motion. Once the motion and/or rate of change in motion are determined, it may be compared to a corresponding motion threshold and motion rate of change threshold. This may include the software comparing it to the corresponding motion threshold and motion rate of change threshold. Based on these comparisons, it may be determined whether there is a turbulent condition. In this manner, it may be understood that the comparison may include a determination of whether the received output exceeds the turbulence threshold value. If the threshold is not exceeded, the method 100 may continue on with receiving an output from at least one of the sensors 42 while the handheld device 40 at 102. If the threshold value is exceeded, then an indication may be made at 106.

It is also contemplated that the output received may be compared to threshold values over time. In this manner, various patterns in the received output may be determined and evaluated. The comparison over time of the received output to the threshold values may indicate turbulence. If the comparison indicates turbulence, then an indication may be provided at 106.

If there is a turbulent condition, then that condition may be indicated to the flight crew at 106. This may include providing an indication on the handheld device 40. For example, an indication may be displayed on the display 44 of the handheld device 40. By way of additional example, an audible indication may be emitted from the handheld device 40. Further, if the determination of the turbulent condition is made by the handheld device 40 and not the controller 30, providing an indication of the turbulent condition may include transmitting a turbulence signal from the handheld device 40 to the aircraft 10. The controller 30 may then provide an indication on a display 22 on the flight deck 18 of the aircraft 10 in response to the turbulence signal, which was transmitted from the handheld device 40. Alternatively, the flight deck 18 may emit an audible indication in response to the turbulence signal provided by the handheld device 40.

It is also contemplated that embodiments of the invention may predict whether an aircraft 10 will move into a turbulent state based on output from the sensors 42. It is contemplated that the controller 30 or the controller 50 may compare the output of the sensors 42 and by identifying the critical angles and/or comparing the output with information located in a database pattern database the program run by the controller 30 or the controller 50 may predict the likelihood of the aircraft 10 moving into a turbulent state. Upon such a determination a preventive maneuver may be suggested via the display 22 to the flight crew.

It is also contemplated that the output from the sensors 42 may be used by the controller 30 or the controller 50 to determine when the aircraft 10 may enter an uncontrollable turn or a fatal Pitch-Roll-Yaw angle. For example, an angle output from one of the sensors 42, such as a gyroscope may be compared to threshold values for critical angles. If the sensed values cross the threshold value, an indication may be provided to the flight crew. It is also contemplated that based on the output from the sensors 42 that it may be predicted when the aircraft will go into an uncontrollable or critical angle. Upon such a determination, a warning may be displayed and an evasive maneuver may be suggested via the display 22 to the flight crew. In this manner, it may be modeled how the aircraft 10 is moving or how the aircraft 10 will move based on the output of the sensors 42. By way of example, case based reasoning and statistical approaches may be used to determine if an uncontrollable situation will occur.

The above mentioned threshold values may be saved in the database located in the memory 32 of the controller 30. The threshold values may be customized for the type of aircraft 10 and type or mission of flight. The threshold may be any suitable predetermined values. An intensity value may also be determined and the intensity value may indicate how much the threshold has been crossed and how fast it was crossed by the sensed value. A higher intensity may correlate to a higher chance of an uncontrollable mode of the aircraft 10. Further, a combination of the threshold value and intensity value may provide a value to determine an uncontrollable situation.

Technical effects of the above described embodiments include that turbulence may be detected using sensors on a handheld device, which provides a variety of benefits including that the above embodiments do not require high infrastructure and installation costs and minimize the cost of software and hardware development for onboard equipment. Furthermore, such handheld devices are widely available and have a reduced cost compared to legacy sensor systems. Further, the embodiments described above have a reduced weight as compared to legacy sensor systems. This results in a reduced operational cost of flying the aircraft. Additionally, the embodiments described above provide for aircrafts to detect turbulence and predict uncontrollable aircraft situations using the handheld device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of determining a turbulent condition in an aircraft with a handheld device having a gyroscope, seismometer, and an accelerometer, the method comprising:
   receiving an output from each of the gyroscope, seismometer, and accelerometer while the handheld device is located within the aircraft;
   comparing, by a processor, the received outputs to corresponding turbulence threshold values for the received outputs; and
   providing, by the processor, an indication on the handheld device or the aircraft of a turbulent condition when the comparing indicates at least one of the received outputs exceeds the corresponding turbulence threshold value.

2. The method of claim 1 wherein the receiving the outputs comprises receiving an angle output from the gyroscope indicative of at least one of a pitch, roll and yaw angle of the aircraft.

3. The method of claim 2, further comprising determining a rate of change for at least one of the pitch, roll and yaw angle from the angle output.

4. The method of claim 3 wherein the comparing comprises comparing the rate of change to a corresponding rate of change threshold value.

5. The method of claim 1 wherein the receiving the output of the seismometer is indicative of vibration motion of the aircraft.

6. The method of claim 1 wherein the receiving the output of the accelerometer output is indicative of the acceleration in multi-dimensional motion of the aircraft.

7. The method of claim 1 wherein the receiving the outputs comprises: receiving an angle output from the gyroscope indicative of a pitch, roll and yaw angle of the aircraft, receiving a motion output from the seismometer, and receiving acceleration output from the accelerometer.

8. The method of claim 7, further comprising determining at least one of the motion and rate of change in motion of the aircraft in a multi-dimensional direction from the angle output, motion output, and acceleration output.

9. The method of claim 8 wherein the determining comprises executing software on the handheld device that receives as input the angle output, motion output, and acceleration output and then calculates the at least one of the motion and rate of change of motion.

10. The method of claim 8 wherein the comparing comprises comparing the at least one of the motion and rate of change in motion to a corresponding motion threshold and motion rate of change threshold.

11. The method of claim 10 wherein the comparing comprises executing software on the handheld device that compares the at least one of the motion and rate of change in the motion to the corresponding motion threshold and motion rate of change threshold.

12. The method of claim 10 wherein the determining further comprises compensating for a relative orientation of the handheld device and the aircraft.

13. The method of claim 10 wherein the providing the indication of the turbulent condition comprises providing an indication on the handheld device.

14. The method of claim 13 wherein the providing the indication on the handheld device comprises at least one of displaying an indication on a display of the handheld device and emitting an audible indication from the handheld device.

15. The method of claim 10 wherein the providing the indication of the turbulent condition comprises transmitting a turbulence signal from the handheld device to the aircraft.

16. The method of claim 15, further comprising providing an indication on a flight deck of the aircraft in response to the turbulence signal.

17. The method of claim 1 wherein the providing the indication of the turbulent condition comprises transmitting a turbulence signal from the handheld device to the aircraft.

18. The method of claim 1, further comprising comparing the received outputs to threshold values over time and providing an indication of a turbulent condition when the comparing indicates turbulence.

19. A method of determining a turbulent condition in an aircraft with a handheld device having a gyroscope and a seismometer, the method comprising:
receiving an output from each of the gyroscope and seismometer while the handheld device is located within the aircraft;
comparing, by a processor, the received outputs to corresponding turbulence threshold values for the received outputs; and
providing, by the processor, an indication on the handheld device or the aircraft, of a turbulent condition when the comparing indicates at least one of the received output exceeds the corresponding turbulence threshold value.

20. A method of determining a turbulent condition in an aircraft with a handheld device having a seismometer and an accelerometer, the method comprising:
receiving an output from each of the seismometer and the accelerometer while the handheld device is located within the aircraft;
comparing, by a processor, the received outputs to corresponding turbulence threshold values for the received outputs; and
providing, by the processor, an indication on the handheld device or the aircraft, of a turbulent condition when the comparing indicates at least one of the received outputs exceeds the corresponding turbulence threshold value.

* * * * *

UNITED STATES PATENT AND TRADEMARK OFFICE
CERTIFICATE OF CORRECTION

Page 1 of 1

PATENT NO. : 9,043,055 B2
APPLICATION NO. : 13/720008
DATED : May 26, 2015
INVENTOR(S) : Pereira It is certified that error appears in the above-identified patent and that said Letters Patent is hereby corrected as shown below:

Claims

In Column 6, Line 33, Claim 1 delete "aircraft" and insert -- aircraft, --, therefor.

In Column 6, Line 50, Claim 6 delete "accelerometer output is" and insert -- accelerometer is --, therefor.

Signed and Sealed this
Twenty-sixth Day of January, 2016

Michelle K. Lee
*Director of the United States Patent and Trademark Office*